United States Patent [19]

Peruzzi et al.

[11] Patent Number: 4,518,326
[45] Date of Patent: May 21, 1985

[54] HERMETIC MOTOR COMPRESSOR FOR REFRIGERATION SYSTEMS AND THE LIKE

[75] Inventors: Federigo Peruzzi; Marek Zgliczynski, both of Turin, Italy

[73] Assignee: Aspera A.p.A., Italy

[21] Appl. No.: 415,299

[22] Filed: Sep. 7, 1982

[30] Foreign Application Priority Data

Sep. 7, 1981 [IT] Italy ............... 68176 A/81

[51] Int. Cl.³ .............. F04B 39/06; F04B 35/04
[52] U.S. Cl. ................... 417/372; 417/419; 417/902; 239/601
[58] Field of Search ........... 417/902, 366, 368, 369, 417/370, 372, 419; 184/6.16, 6.18; 138/115, 111; 239/601

[56] References Cited

U.S. PATENT DOCUMENTS

| | | | |
|---|---|---|---|
| 835,403 | 11/1906 | Coughlan | 239/601 |
| 1,967,034 | 7/1934 | Lipman | 417/902 X |
| 2,628,016 | 2/1953 | Higham | 417/372 X |
| 2,959,359 | 11/1960 | Casaletto | 239/601 |
| 3,672,571 | 6/1972 | Goodricke | 138/115 X |

*Primary Examiner*—Richard E. Gluck
*Assistant Examiner*—Peter M. Cuomo
*Attorney, Agent, or Firm*—Sughrue, Mion, Zinn, Macpeak, and Seas

[57] ABSTRACT

The motor compressor comprises a hermetic casing in which are mounted a reciprocating compressor and a reversible electric motor having a common vertical shaft with an axial duct for conveying lubricating oil from a centrifugal pump located at the lower end of the shaft to an outlet located at its upper end. The outlet of the axial duct is constituted by an elbow tube which is fixed to the upper end of the shaft and has an inclined end portion extending upwardly and radially outwardly with respect to the axis of the shaft.

1 Claim, 2 Drawing Figures

U.S. Patent  May 21, 1985  4,518,326
FIG. 1
FIG. 2
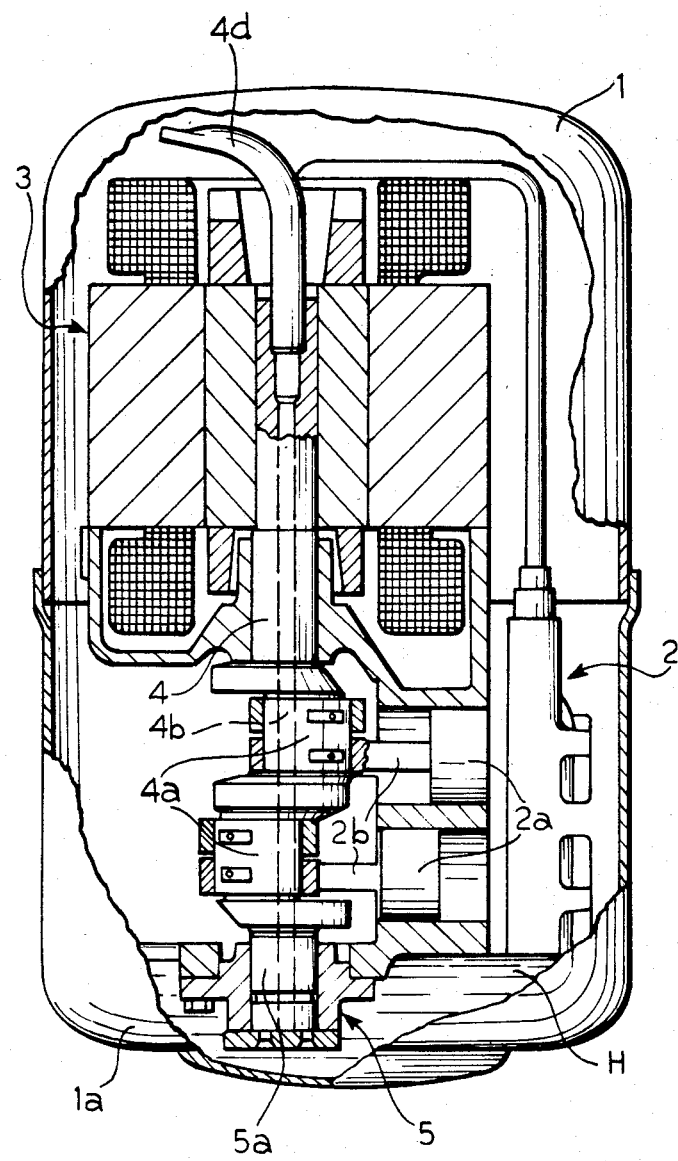
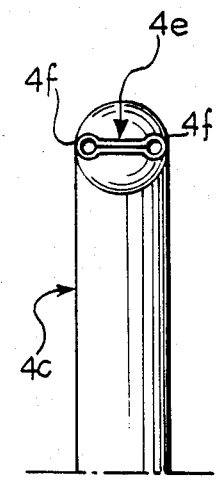

HERMETIC MOTOR COMPRESSOR FOR REFRIGERATION SYSTEMS AND THE LIKE

The present invention relates to hermetic motor compressors for refrigeration systems and the like, and is particularly concerned with a motor compressor of the type comprising a hermetic casing in which are mounted a reciprocating compressor and a reversible electric motor having a common vertical shaft with an axial duct for conveying lubricating oil from a centrifugal pump located at the lower end of the shaft to an outlet at its upper end.

In motor compressors of the type specified above, there is a problem in lubricating the mechanical parts, such as, for example, the shaft connecting the compressor to the motor, the journals which support this shaft, the connecting rods and pistons of the compressor, with oil contained in the hermetic casing while simultaneously ensuring sufficient cooling of the lubricating oil to avoid overheating of the motor compressor.

The lubricating oil is usually circulated by a centrifugal pump driven by the motor. In large-size motor compressors, which include a three-phase electric motor, it is not possible to use a unidirectional centrifugal pump. Suitable pumps must have a symmetrical configuration in order to allow them to operate in both senses of rotation. The order of the electrical connection of the three phases of the motor may, in fact, vary from one motor to another so that the motors do not all rotate in a predetermined sense. Since the motor is enclosed in a hermetic metal casing, however, it is not possible to ascertain the sense of rotation from the exterior and reverse it if necessary.

The use of a symmetrical centrifugal pump, that is, one which is able to deliver in both senses of rotation, is therefore imperative. This does, however, involve the disadvantage of a low head of pressure, both because of the limitations of the maximum diameter of the rotor and because the symmetrical configuration does not allow the pump rotor to have the optimum characteristics.

In order to obtain a jet of oil towards the top of the compressor casing of sufficient volume to facilitate the transfer of heat from the oil, it is thus necessary to use an oversized pump involving a consumption of power from the motor which is far from negligible.

The problem behind the present invention is that of allowing the use of a symmetrical centrifugal pump with a relatively low head of pressure while achieving a sufficient jet of oil towards the top of the compressor casing. In order to solve this problem, the present invention has as its subject a hermetic motor compressor of the aforesaid type, characterised in that the outlet of the axial duct is constituted by an elbow tube which is fixed to the upper end of the shaft and has an inclined end portion extending upwardly and radially outwardly with respect to the axis of the shaft.

By virtue of this solution, the inclined end portion of the elbow tube acts as a further centrifugal pump which is arranged in series with the one located at the lower end of the shaft, and is able to make up for the low head of pressure of the lower pump.

The invention will now be described, by way of non-limiting example, with reference to the appended drawings, in which:

FIG. 1 is a partly cut-away vertical sectional view of a motor compressor according to the invention, and FIG. 2 illustrates a detail of FIG. 1 on an enlarged scale and from a different direction.

In FIG. 1 is shown a hermetic casing 1 within which are mounted a reciprocating compressor and a reversible electric motor 2, 3 respectively.

In the embodiment illustrated, the reciprocating compressor 2 includes four pistons 2a, only two of which are visible in FIG. 1.

The movement of the pistons 2a is effected through connecting rods 2b articulated on respective pins 4a of a shaft 4.

The lower part 1a of the casing contains a supply of lubricating oil H in which a symmetrical centrifugal pump 5 at the lower end of the shaft 4 is immersed.

The pump 5 has a rotor 5a which is fixed for rotation with the shaft 4.

The rotor 5a of the centrifugal pump 5 and the lower part of the shaft 4 have ducts for conveying the lubricating oil from the pump to the mechanical parts of the compressor.

The shaft 4 has an axial duct 4b which conveys the lubricating oil H from the centrifugal pump 5 towards the upper end of the shaft itself.

At this upper end, the duct 4b has an outlet constituted by an elbow tube 4c fixed to the shaft 4. The elbow tube 4c has an end portion 4d which extends upwardly and radially outwardly with respect to the axis of the shaft 4.

The end portion 4d of the elbow tube (FIG. 2) is tapered so as to have a section which decreases in area towards its free end acting as the outlet.

This free outlet end has a part 4e which is flattened in the general plane of inclination of the end portion 4d and two tubular parts 4f flanking the middle part 4e. The tubular parts 4f define respective nozzles which are located side-by-side in the path of rotation of the free end of the end portion 4d.

The elbow tube 4c is preferably made by shaping from an off-cut of sheet metal tubing.

During the operation of the motor compressor, the lubricating oil H rises in the axial duct 4b from the centrifugal pump 5 towards the elbow tube 4c.

When the lubricating oil H reaches the end portion 4d of the elbow tube 4c, it is projected by the centrifugal effect towards the top of the hermetic casing 1 through the nozzles 4f. Thus, the end portion 4d acts as a further centrifugal pump which is arranged in series with the pump 5 at the lower end of the shaft 4, and is able to make up for the low head of pressure of the pump 5, which is of the symmetrical centrifugal type.

The oil descends by gravity towards the lower part 1a, which acts a sump for collecting the oil H, cooling it by contact with the walls of the casing over which the external air passes.

Depending on the sense of rotation, the majority of the oil is projected through the nozzle 4f located to the rear with respect to the circular path of rotation, while refrigerant gas is released through the other nozzle 4f located forwardly. This effect is beneficial since, if the refrigerant gas remained mixed with the lubricating oil H, it might be released in the ducts for the oil H and obstruct the regular flow of oil to the parts to be lubricated.

Naturally, the principle of the invention remaining the same, the details of construction and forms of embodiment may be varied widely from that described and illustrated, without thereby departing from the scope of the present invention.

We claim:

1. Hermetic motor compressor for refrigeration systems and the like, of the type comprising a hermetic casing in which are mounted a reciprocating compressor and a reversible electric motor having a common vertical shaft with an axial duct for conveying lubricating oil from a centrifugal pump located at the lower end of the shaft to an outlet at its upper end, wherein the outlet of the axial duct is constituted by an elbow tube which is fixed to the upper end of the shaft and has an end portion extending upwardly and radially outwardly with respect to the axis of the shaft and wherein the end portion of the elbow tube is tapered so as to have a section which decreases in area towards its free outlet end with the free outlet end of the elbow tube having a central part which is flattened in the general plane of inclination of the end portion to define two tubular parts which define respective nozzles located side-by-side in the path of rotation of the free outlet end.

* * * * *